United States Patent
Hayashi

(10) Patent No.: US 6,817,712 B2
(45) Date of Patent: Nov. 16, 2004

(54) METALLIC VAPOR DEPOSITION LENS PROVIDED WITH A PROTECTION COAT AND A METHOD OF PRODUCING THE SAME

(75) Inventor: Hokao Hayashi, Fukui (JP)

(73) Assignee: Nicoh Optical Co., Ltd., Fukui (JP)

( * ) Notice: Subject to any disclaimer, the term of this patent is extended or adjusted under 35 U.S.C. 154(b) by 0 days.

(21) Appl. No.: 10/282,085

(22) Filed: Oct. 29, 2002

(65) Prior Publication Data

US 2004/0070727 A1 Apr. 15, 2004

(30) Foreign Application Priority Data

Oct. 11, 2002 (JP) ........................................ 2002-298347

(51) Int. Cl.$^7$ ................................................. G02C 7/02
(52) U.S. Cl. ....................................................... 351/166
(58) Field of Search ........................................ 351/166

(56) References Cited

U.S. PATENT DOCUMENTS

| | | | | |
|---|---|---|---|---|
| 4,783,374 A | * | 11/1988 | Custer et al. ............... | 428/447 |
| 6,010,778 A | * | 1/2000 | Kimura et al. ............. | 428/328 |
| 6,051,310 A | * | 4/2000 | Cano et al. ................. | 428/336 |
| 6,207,263 B1 | * | 3/2001 | Takematsu et al. ......... | 428/220 |
| 6,250,758 B1 | * | 6/2001 | Yoshihara et al. .......... | 351/163 |

FOREIGN PATENT DOCUMENTS

JP    2001-350122    12/2001

* cited by examiner

Primary Examiner—Scott J. Sugarman
Assistant Examiner—Darryl J. Collins
(74) Attorney, Agent, or Firm—Snider & Associates; Ronald R. Snider

(57) ABSTRACT

A metallic vapor deposition lens provided with a protection coat is provided, the surface of which lens is finished smooth and good at abrasion-proof characteristic.

The metallic vapor deposition lens of the invention is characterized in that a filmy layer 2 made from a metallic material m is formed on at least one side surface of a lens proper 1 by vapor deposition and a polymerized and hardening layer 3 made from diethylene glycol bis(allyl carbonate) is overlaid on said metallic deposition filmy layer 2 so as to protect the surface of said filmy layer 2.

The coat formation made from this diethylene glycol bis-(allyl carbonate) resin over the surface of said metallic deposition filmy layer prevents the same surface from being scratched off and the higher ductility and the lower viscosity of said resin allows the protection coat to be uniformly formed without inconsistency so as to prevent the wavy patterns with rainbow colors owing to the difference in thickness and the interference of the visible light from appearing on the lens surface. This avoids giving a strange look on the wearer's face.

12 Claims, 4 Drawing Sheets

METALLIC VAPOR DEPOSITION LENS PROVIDED WITH A PROTECTION COAT AND A METHOD OF PRODUCING THE SAME

RELATED APPLICATION

The present application claims the priority of Japanese Patent Application No. 2002-298347 filed on Oct. 11, 2002, which application is incorporated herein by reference.

BACKGROUND OF THE INVENTION

1. Technical Field

The invention relates to the improvement of a metallic vapor deposition lens adopted for the spectacle lens and the sunglasses and the production method of the same, in more details, pertaining to such metallic vapor deposition lens provided with a protection coat as being smooth on the surface and excelling in abrasion-proof characteristic and the production method of the same lens.

2. Prior Art

As known, a polarized lens is generally adopted for the sunglasses, which polarized lens is arranged by attaching a polarized film on the glasses and one example of which is disclosed in Japanese Patent Application Laid-open No. 2001-350122 (refer to Pages 3 through 5 and FIGS. 1 through 3).

The recent progress of the lens processing technique leads to the development of a high-performance metallic vapor deposition lens wherein a metallic material is attached on the outer surface of the lens by vapor deposition so as to reflect visible light, which lens is especially popular among the users where being finished with a lustrous touch.

However, such metallic vapor deposition lens as mentioned above is poor at abrasion-proof characteristic so that the metallic deposition layer is easily peeled off by an inadvertent contact therewith. Thus, due care should be taken to handle the same.

Under such circumstances as mentioned above, in order to protect the metallic deposition layer, conventionally, the method of dipping the lens into the fused resin material is known, which method causes the non-uniform attachment of the resin coat on the lens surface owing to the viscosity-related unbalanced spreading of the fused resin material thereon. This unavoidably causes the inconsistency of the attached resin coat on the finished lens surface, which results in the appearance of the wavy patterns with rainbow colors on the surface owing to the difference in thickness of the attached resin coat and the interference of the visible light. This gives a strange look on the wearer's face.

DISCLOSURE OF THE INVENTION

In view of the above inconveniences encountered with the prior metallic vapor deposition lens, the invention is to provide a metallic vapor deposition lens provided with a protection coat that is smooth on the surface and excels in abrasion-proof characteristic.

The invention is further to provide a method of efficiently and economically producing a metallic vapor deposition lens provided with a protection coat that is smooth on the surface and excels in abrasion-proof characteristic, which protection coat is made of a casting resin essentially consisting of diethylene glycol bis(allyl carbonate) characteristic in lower viscosity and higher ductility.

Namely, in order to solve the above issues, the metallic vapor deposition lens provided with a protection coat according to the invention is characterized in that a vapor deposition filmy layer 2 made from a metallic material m is formed on at least one side surface of a lens proper 1 and a polymerization hardening layer 3 made from diethylene glycol bis (allyl carbonate) is overlaid on the filmy layer 2 so as to protect the surface of the vapor deposition filmy layer 2.

Further, the above metallic vapor deposition lens is characterized in that the polymerization hardening layer 3 overlaid on the surface of the vapor deposition filmy layer 2 has approximately 0.1 mm in thickness.

Further, the above metallic vapor deposition lens is characterized in that the lens proper 1 is made from a polycarbonate resin material.

Furthermore, the above metallic vapor deposition lens is characterized in that the metallic material m of the vapor deposition layer 2 comprises either a sole component or combined components selected from the group consisting of chromium, chromiumoxide, siliconedioxide, zirconium dioxide, titanium dioxide, alumina and gold.

Moreover, the above metallic vapor deposition lens is characterized in that the whole lens including the lens proper 1 and the polymerization hardening layer 3 is laminated by a hardening coat 4.

Then, the method of producing a metallic vapor deposition lens provided with a protection coat according to the invention is characterized in comprising the steps of placing a lens proper 1 in a vacuum chamber V and depressurizing the chamber; vaporizing a metallic material m in the chamber as depressurized by means of a heating means and filming the metallic material as vaporized on a convex surface of the lens proper 1 so as to form a metallic deposition filmy layer 2; dropping a casting resin R of lower viscosity essentially consisting of diethylene glycol bis(allyl carbonate) into a casting die D provided with a concave cavity C corresponding to a concave surface of the lens proper 1; placing the metallic deposition filmy layer 2 formed on the convex surface of the lens proper 1 as taken out of the vacuum chamber V on a concave surface of the cavity C so as to uniformly spread and attach the casting resin R on the metallic deposition filmy layer 2 and polymerizing and hardening the casting resin R as spread under heating treatment; and taking out an integral lens prototype Lb from the casting die D and subjecting the lens prototype to finishing treatment so as to produce the metallic vapor deposition lens provided with a protection coat L.

Further, the above method of producing a metallic vapor deposition lens is characterized in adjusting an input amount of the casting resin R such that the resin R is increased so as to form a polymerized hardening layer 3 of larger thickness on a convex surface of the metallic deposition filmy layer 2.

Furthermore, the above method of producing a metallic vapor deposition lens is characterized in laminating a hardening coat on the whole surface of the lens L as subjected to the finishing treatment.

BEST MODE FOR CARYYING OUT THE INVENTION

Hereafter, the preferred embodiment of the invention is described in more details with reference to the accompanying drawings.

Figure 1:
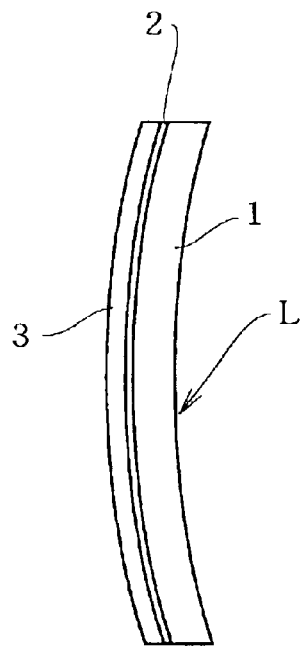
FIG. 1 is an edge side view of a metallic vapor deposition lens according to the embodiment of the invention.

The metallic vapor deposition lens according to the invention is described with reference to FIG. 1. In the drawing, numeral reference 1 indicates a lens proper, which lens is made from a plastic material (polycarbonate). However, it may be made from glass or arranged with an overlaid polarized film, and a color lens is also adoptable.

Numeral reference 2 indicates a metallic deposition filmy layer, which layer is formed on at least one side surface of the lens proper 1 (on the convex side surface thereof in this embodiment) by filming a metallic material m thereon by vapor deposition. Numeral reference 3 indicates a polymerized hardening layer, which layer is made from diethylene glycol bis (allyl carbonate) and overlaid on the convex side surface of the metallic deposition filmy layer 2 so as to protect the outer surface of the same layer 2.

In the instant embodiment, the finished lens L has 70 mm in diameter wherein the lens proper 1 has 3 mm in thickness, and the metallic deposition filmy layer 2 has 1 $\mu$m in thickness and the outermost polymerized and hardening layer 3 thereof has 0.1 mm in thickness.

Polyvinyl butyral is thinly coated on the convex side surface of the metallic deposition filmy layer 2, which is not shown in the drawing, so as to strengthen the bonding between the metallic deposition filmy layer 2 and the polymerized hardening layer 3.

MODIFIED EXAMPLE

Figure 2:
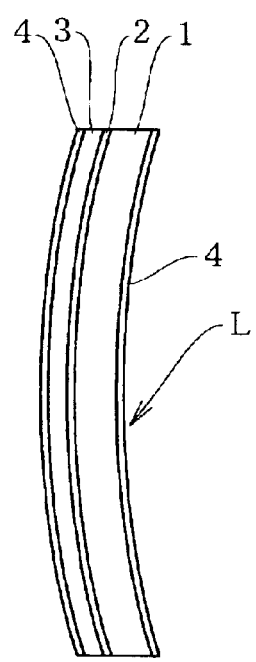
FIG. 2 is an edge side view of a metallic vapor deposition lens according to the modified example of the invention.

Then, the modified example of the metallic vapor deposition lens according to the invention is described with reference to FIG. 2. The difference between the above embodiment and the modified example lies in that a hardening coat 4 having 0.05 mm in thickness, which coat is manufactured by Kabushiki Kaisha Tokuyama under the trade name of 'TS-56T', is laminated on the convex side surface of the polymerized hardening layer 3 and the concave side surface of the lens proper 1 respectively.

Further, the polymerized hardening layer 3 formed on the convex side surface of the lens proper 1 is thickened while the lens proper 1 is thinned accordingly.

In this modification, the finished lens L has 70 mm in diameter wherein the lens proper 1 has 3 mm in thickness and the metallic deposition filmy layer 2 has 1 $\mu$m in thickness, and the polymerized and hardening layer 3 formed on the convex side surface of the lens proper 1 has 3 mm in thickness and the hardening coat 4 has 0.05 mm in thickness.

The formation of the thicker polymerized hardening layer 3 formed on the convex side surface of the lens proper 1, which layer is made from diethylene glycol bis(allyl carbonate) characteristic in high transparency, allows the finished lens L to be made more durable and lighter in weight synergistically with the shock-proof characteristic of polycarbonate adopted for the lens proper 1.

PRODUCTION EXAMPLE

The method of producing the metallic vapor deposition lens according to the invention is described below with reference to FIGS. 2 through 6.

To begin with, the convex side surface of the lens proper 1 is subjected to vapor deposition so as to form a metallic deposition filmy layer 2 thereon. Concretely speaking, the lens proper 1 is placed in a chamber V of a vacuum deposition means and such metallic material m as chromium (Cr), chromium oxide ($Cr_2O_3$), silicone dioxide ($SiO_2$), zirconium dioxide ($ZrO_2$), titanium dioxide ($TiO_2$), alumina ($Al_2O_3$) and gold (Au) is heated under the temperature ranging from 1100 to 1800 (K) by means of a heating means Hi (an electron gun being exemplified in this embodiment) and vaporized with the atmosphere within the chamber depressurized to of the order of $10^{-5}$ (Torr), which vaporized material is attached on the convex side surface of the lens proper 1.

The above metallic deposition filmy layer comprises the sole lamination with the characteristic of the vaporized metallic material m in use and a given thickness, which filmy layer may comprise the multi-laminations respectively having a different characteristic and thickness. Further, the lustrous metallic material being adopted for the filmy layer, the lens is finished with a lustrous and decorative touch and capable of reflecting the green and blue components of the visible light.

Figure 3:
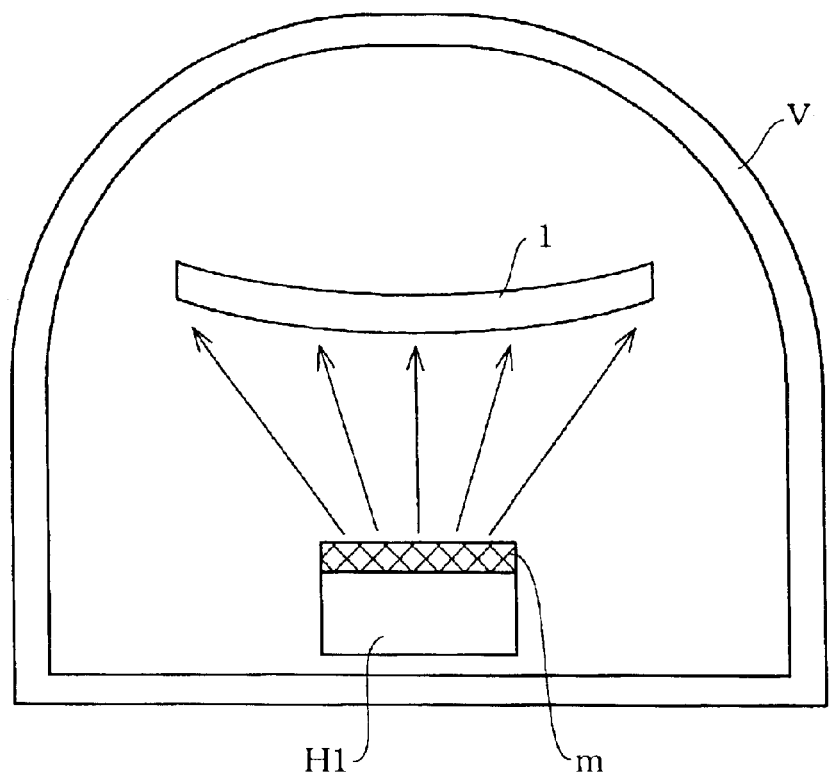
FIG. 3 is a view to show an operational step where the surface of the lens proper is subjected to a metallic vapor deposition.

Then, the method of forming the polymerized and hardening layer is described below. In FIG. 3, reference D indicates a casting die made from glass, the top surface of which die is provided with a smooth and concave cavity C.

In the first place, 0.4 cc of the casting resin R is dropped into the central portion of the cavity C, which resin is a solution prepared by mixing the 60 wt. % of diethylene glycol bis (allyl carbonate) that is a monomer produced by Nihon Yushi Kabushiki Kaisha under the trade name of 'RAV-7AT' with the 6 wt. % of diisopropyl peroxydicarbonate that is a polymerization initiator produced by Nihon Yushi Kabushiki Kaisha under the trade name of 'RAV-7BT', the viscosity of which solution has 13.5 cps under the temperature of 25 degrees Centigrade.

Then, the lens proper 1 is overlaid on the casting resin R as dropped on the cavity C such that the convex side surface of the metallic deposition filmy layer 2 aligns with the corresponding cavity surface, which allows the resin R to be uniformly spread over the convex side surface of the metallic deposition filmy layer 2 so as to form a spread resin R'. It should be noted that polyvinyl butyral resin is preliminarily coated on the convex side surface of the metallic deposition filmy layer 2 for enhancing the bonding between the same layer and the spread resin.

Figure 4:
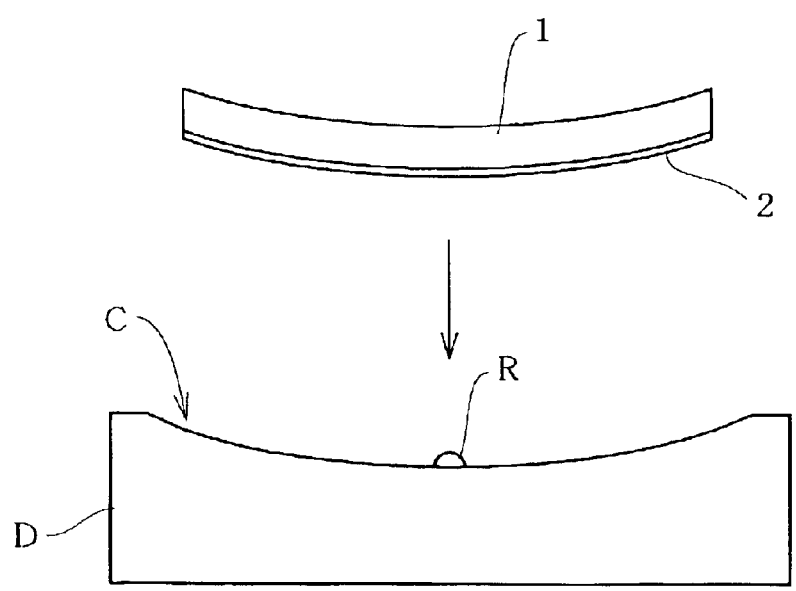
FIG. 4 is a view to show an operational step where the curved lens is placed on the cavity of the casting die with the casting resin dropped thereon.
Figure 5:
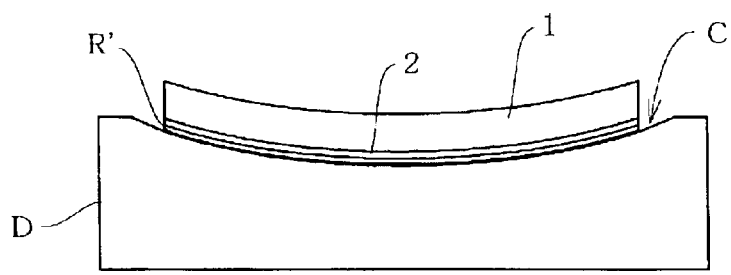
FIG. 5 is a view to show an operational step where the casting resin is spread over the convex surface of the metallic deposition filmy layer.

The lens in work as disposed in the casting die D, as shown in FIG. 4, is placed together with the die in a far infrared radiation heater H2, which lens is left in the same heater for about three hours under the temperature ranging from 35 to 50 degrees Centigrade so as to be subjected to initial polymerization treatment. Upon the completion of initial polymerization, the lens in work is heated again in the same heater for about five hours under the temperature of about 90 degrees Centigrade so as to be subjected to polymerization treatment. The reference h in plurality shown in FIG. 5 indicates a ceramic far infrared radiation element.

Figure 6:
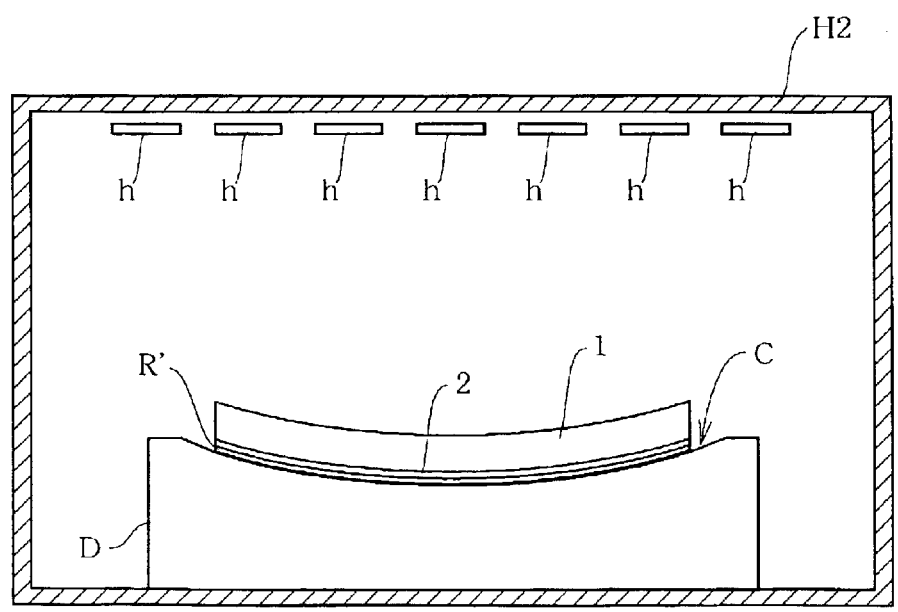
FIG. 6 is a view to show an operational step where the lens prototype in the state as shown in FIG. 5 is polymerized and hardened inside the far infrared radiation heater.
Figure 7:
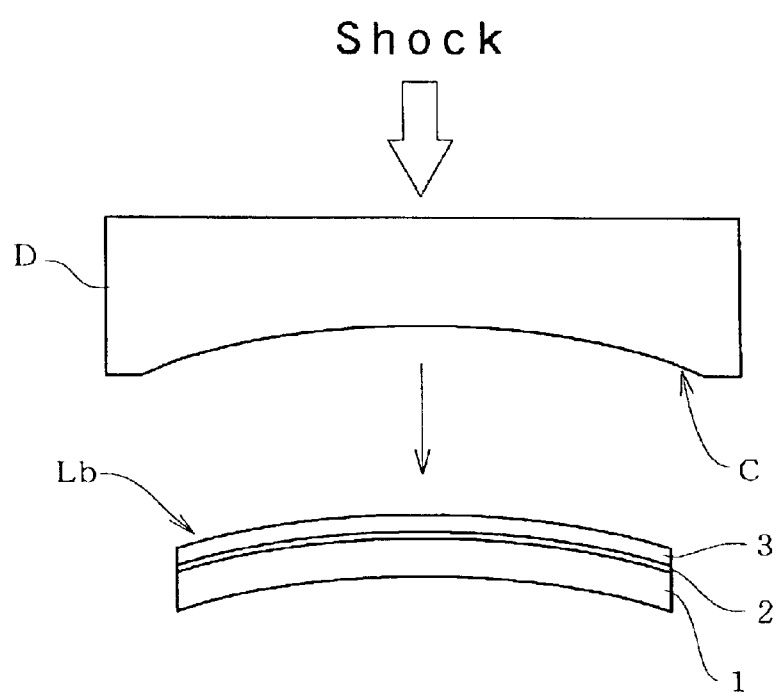
FIG. 7 is a view to show the state where the lens prototype as polymerized and hardened is removed from the casting die.

Upon the completion of polymerization, the casting die D is taken out of the heater H2. The diethylene glycol bis(allyl carbonate) monomer as polymerized and hardened on the cavity C is integrated into the lens proper so as to form a lens prototype Lb, which prototype is attached on the cavity surface, but easily detached therefrom by lightly striking the bottom side surface of the die D as shown in FIG. 6, as the prototype is good at detaching from the glass surface of the cavity C. The lens prototype Lb as detached from the die D is then subjected to such finishing treatment as the removal of burrs and cleansing.

The preferred embodiment of the invention is substantially described above, to which the invention is not limited, but can be modified into various manners within the accompanying patent claims. For instance, it is disclosed above that the metallic deposition filmy layer 2 is formed only on the convex side surface of the lens proper 1, which may be formed on the concave side surface or both side surfaces thereof. Likewise, the polymerized hardening layer 3 may be formed on the concave side surface of the lens proper 1 or on both side surfaces thereof.

Further, it is exemplified above that polyvinyl butyral resin is adopted for the adhesive to enhance the bonding between the spread resin and the metallic deposition filmy layer, which adhesive is not essential to the invention. Any adhesives will do if they are good at transparency and compatible with diethylene glycol bis(allyl carbonate). Poly (vinyl alcohol) resin may be adopted for that purpose, which also belongs to the technical scope of the invention.

Further, any of a certain type of pigment among others, an ultraviolet rays absorbent and an infrared rays absorbent or the combination thereof may be mixed in the diethylene glycol bis(allyl carbonate) monomer adopted for the casting resin R so as to produce the metallic vapor deposition lens provided with a protection coat, which also belongs to the technical scope of the invention.

As described with the above embodiment, the metallic vapor deposition lens according to the invention is arranged such that the metallic deposition filmy layer surface of the lens proper is coated with the diethylene glycol bis(allyl carbonate) resin so as to prevent the metallic material vapor-deposited on the lens proper surface from being scratched off and the same resin is uniformly spread over and attached on the metallic deposition filmy layer without inconsistency so as to prevent the wavy patterns from appearing on the lens surface owing to the difference in thickness and the interference of the visible light, which avoids giving a strange look on the wearer's face.

Accordingly, the metallic vapor deposition lens of the invention is an epoch-making product and the production method of the same is also efficient and economical, the industrial applicability of which is very high.

What is claimed is:

1. A metallic vapor deposition lens provided with a protection coat wherein a metallic deposition filmy layer (2) is formed on at least one side surface of a lens proper (1) and a polymerized hardening layer (3) made from diethylene glycol bis(allyl carbonate) resin is overlaid on said metallic deposition filmy layer (2) so as to protect a surface of said filmy layer (2).

2. A metallic vapor deposition lens provided with a protection coat according to claim 1, wherein said polymerized and hardening layer (3) overlaid on said metallic deposition filmy layer (2) has approximately 0.1 mm in thickness.

3. A metallic vapor deposition lens provided with a protection coat according to claim 1, wherein said lens proper (1) is made from a polycarbonate resin material.

4. A metallic vapor deposition lens provided with a protection coat according to claim 1, wherein a metallic material m of said metallic deposition filmy layer (2) comprises one of a sole component and combined components selected from the group consisting of chromium, chromium oxide, silicone dioxide, zirconium dioxide, titanium dioxide, alumina and gold.

5. A metallic vapor deposition lens provided with a protection coat according to claim 3, wherein a metallic material m of said metallic deposition filmy layer (2) comprises one of a sole component and combined components selected from the group consisting of chromium, chromium oxide, silicone dioxide, zirconium dioxide, titanium dioxide, alumina and gold.

6. A metallic vapor deposition lens provided with a protection coat according to claim 1, wherein said lens as a whole including said lens proper (1) and said polymerized and hardening layer (3) is laminated with a hardening coat (4).

7. A metallic vapor deposition lens provided with a protection coat according to claim 3, wherein said lens as a whole including said lens proper (1) and said polymerized and hardening layer (3) is laminated with a hardening coat (4).

8. A metallic vapor deposition lens provided with a protection coat according to claim 4, wherein said lens as a whole including said lens proper (1) and said polymerized and hardening layer (3) is laminated with a hardening coat (4).

9. A metallic vapor deposition lens provided with a protection coat according to claim 5, wherein said lens as a whole including said lens proper (1) and said polymerized and hardening layer (3) is laminated with a hardening coat (4).

10. A metallic vapor deposition lens provided with a protection coat according to claim 2, wherein said lens proper (1) is made from a polycarbonate resin material.

11. A metallic vapor deposition lens provided with a protection coat according to claim 2, wherein a metallic material m of said metallic deposition filmy layer (2) comprises one of a sole component and combined components selected from the group consisting of chromium, chromium oxide, silicone dioxide, zirconium dioxide, titanium dioxide, alumina and gold.

12. A metallic vapor deposition lens provided with a protection coat according to claim 2, wherein said lens as a whole including said lens proper (1) and said polymerized and hardening layer (3) is laminated with a hardening coat (4).

* * * * *